(12) United States Patent
Coleman

(10) Patent No.: US 7,096,737 B2
(45) Date of Patent: Aug. 29, 2006

(54) PRESSURE SENSING APPARATUS

(76) Inventor: Nate Coleman, 40485-D Murrietta Hot Springs Rd., PMB 349, Murrietta, CA (US) 92563

( * ) Notice: Subject to any disclaimer, the term of this patent is extended or adjusted under 35 U.S.C. 154(b) by 0 days.

(21) Appl. No.: 10/638,586

(22) Filed: Aug. 11, 2003

(65) Prior Publication Data

US 2004/0031323 A1   Feb. 19, 2004

Related U.S. Application Data

(63) Continuation-in-part of application No. 09/357,056, filed on Jul. 19, 1999, now Pat. No. 6,604,427.

(51) Int. Cl.
*G01L 7/08* (2006.01)
(52) U.S. Cl. .................................................. 73/715
(58) Field of Classification Search .............. 73/115, 73/715, 716, 717, 714, 718, 729.1, 729.2
See application file for complete search history.

(56) References Cited

U.S. PATENT DOCUMENTS

| | | | | |
|---|---|---|---|---|
| 4,125,848 A | * | 11/1978 | Ito et al. ..................... | 396/227 |
| 4,899,046 A | * | 2/1990 | Wright et al. ........... | 250/227.14 |
| 4,926,696 A | * | 5/1990 | Haritonidis et al. .......... | 73/705 |
| 5,390,546 A | * | 2/1995 | Wlodarczyk ................. | 73/715 |
| 5,450,752 A | * | 9/1995 | White et al. .................. | 73/643 |
| 5,591,914 A | * | 1/1997 | White et al. .................. | 73/643 |
| 5,600,070 A | * | 2/1997 | Wlodarczyk ................. | 73/715 |
| 6,604,427 B1 | * | 8/2003 | Coleman .................... | 73/729.1 |
| 2002/0020221 A1 | * | 2/2002 | Sittler et al. .................. | 73/715 |
| 2002/0122024 A1 | * | 9/2002 | Roggatz ...................... | 345/102 |

* cited by examiner

*Primary Examiner*—Eric S. McCall

(57) ABSTRACT

A Pressure Sensing Apparatus is disclosed. Also disclosed is an apparatus that provides increased pressure sensitivity without added cost and complexity in the electronic detector circuitry. The apparatus further is less sensitive to gravity, vibrations or other external influences. It is a still further object that the apparatus be available with curved bellow head, formed with either concave or convex reflective surfaces. Other versions of the apparatus may have a deflectable focusing diaphragm that permits pressure detection responsive to the curvature of the diaphragm in response to pressure differentials across the diaphragm.

4 Claims, 14 Drawing Sheets

PRESSURE SENSING APPARATUS

This application is a continuation-in-part of application Ser. No. 09/357,056, filed Jul. 19, 1999, patent U.S. Pat. No. 6,604,427 B1, dated Aug. 12, 2003.

BACKGROUND OF THE INVENTION

1. Field of the Invention

This invention relates generally to pressure sensors and, more specifically, to a Pressure Sensing Apparatus.

2. Description of Related Art

The bellows-type pressure sensor is widely used in high sensitivity applications. Essentially, what is involved is a very small bellow that is configured to reflect light onto a detector. When the bellow stretches or contracts in response to a pressure change, the detector will sense a corresponding change in the light intensity.

FIG. 1 is a perspective view of a prior art bellow assembly 10. As can be seen, from its outer dimensions, the bellow assembly 10 comprises a stem 12 from which extends the bellow section 14 which terminates in the head 16. The bellow section 14 is formed somewhat like an accordion, such that the bellow assembly 10 can stretch and shrink in response to changes in external forces. If we now turn to FIG. 2, we can examine the details of how this bellow assembly 10 functions to detect pressure.

FIG. 2 is a partial cutaway side view of the bellow assembly 10 of FIG. 1. Again we can see that the bellow section 14 extends from the stem 12 and terminates in the head 16. In this current embodiment the head 16 comprises a reflector 18 formed on its inner surface. Within the bellow section 14 is conventionally located a light detector 20 mounted on a stand 22. Also found within the bellow section 14 is a light emitter 24. The light emitter is configured to transmit light to the reflector 18 where it is in turn reflected towards the light detector 20. In a conventional bellow assembly pressure detector 10, the light detector 20 is sensitive enough to detect a change in light intensity in response to a change in bellow length 26. It should be noticed that in this conventional design, the reflector 18 has always been substantially flat. As such, the reflective light does not converge in any sort of focal point but instead essentially reflects outward in a Gaussean distribution and is spread into a wide area at the depth of the receiver 20; when the reflector moves towards the receiver 20, reflected areas become smaller (in effect focusing the signal). If one imagines that the bellow assembly 10 has an internal pressure $_1$ (which may be effectively zero) and the bellow assembly 10 is located within another volume at a unknown pressure $P_X$, as $P_X$ is changed, the bellow length 26 will also change to some length determined by the pressure difference and the physical properties of the bellow. It is this bellow length change 26 that is detected by the detector 20 and converted into an electrical signal for display to the user. FIG. 3 depicts further information about this prior art device.

FIG. 3 is a partial cutaway side view of a conventional bellow-type pressure sensor 30 of the present invention. As can be seen, bellow assembly 10 is typically located within a chamber 28. If we imagine that the bellow assembly 10 is isolated from the chamber 28 and that the chamber 28 includes a sensor tube 32 for sensing an external pressure, we can appreciate that when the sensor tube 32 is placed in a location such that the pressure $P_X$ changes from some reference pressure, and the bellows 10 later extend or contract while the internal pressure $P_1$ seeks to reach equilibrium with the sensed or unknown pressure $P_X$. If we now turn to FIGS. 4A through 4C we can discuss the operation of the prior device more fully.

FIG. 4A is a depiction of the signal path of the bellow assembly 10 of FIGS. 1, 2 and 3. In this simplified drawing, the reflector 18 is shown at a distance $L_{X1}$ from the detector 20. We will assume at this point that $L_{X1}$ defines the at rest condition of the bellow 10. As can be seen, the transmitted light 34 from the transmitter (not shown) strikes the reflector 18 and is reflected back as reflected light 36. As discussed above, it should be understood that substantially all of the transmitted light 34 is returned along the identical path of its arrival 36. Some light however, will scatter as a result of surface irregularities on the reflector 18 and it is this light that is most likely received by the detector 20 (and therefore may contribute to the dynamic range). If we turn to FIG. 4B we can see that when the sensed pressure changes, the distance between the reflector 18 and the detector 20 changes to $L_{X2}$.

FIG. 4B is a depiction of the device of FIG. 4A after a pressure change has occurred. It should be casually apparent that the reflected light 36 is not substantially changed by the change in the location of the reflector 18. In fact, in order to sense this changed distance, detector 20 must be extremely sensitive (and therefore expensive). Even still, this design will provide a fairly responsive and sensitive pressure detector having a dynamic range in the area of 2 dB. If we now turn to FIG. 4C we can see yet another limitation of the prior sensor.

FIG. 4C is a depiction of the device of FIGS. 4A and 4B when the device is experiencing off-axis deflection. As can well be imagined, the bellow 10 in order to be sensitive, is formed from very thin-walled material. As such, it is affected by external forces including vibrations, gravity and other acceleration and it is common for these external forces to result in an off-axis deflection θy. As can be seen here, while the transmitted light 34 has not changed, when a theoretical deflection θy is caused in the bellow 10, the reflected light 36 tends to be directed away from the detector 20. As such, where the sensor is experiencing vibrations they might actually be sensed as pressure changes but in fact this is not necessarily the case. This, again, adds expense because the detector must be isolated for many external acceleration-type forces.

What is needed therefore, is an improved pressure sensor that will increase responsiveness of the detector while reducing the need for an extremely sensitive detector. It would further be desirable if the improved sensor was less sensitive to off-axis deflection.

SUMMARY OF THE INVENTION

In light of the aforementioned problems associated with the prior devices, it is an object of the present invention to provide a Pressure Sensing Apparatus. It is an object that the improved apparatus provide increased pressure sensitivity without added cost and complexity in the electronic detector circuitry. It is a further object that the apparatus be less sensitive to gravity, vibrations or other external influences. It is a still further object that the apparatus be available with either concave or convex reflective surfaces, or a lens. It is a further object that the signal strength be increased. Other versions of the apparatus should have a deflectable focusing diaphragm that permits pressure detection responsive to the curvature of the diaphragm in response to pressure differentials across the diaphragm.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

FIGS. 13A and 13B are top and cutaway side views, respectively, of another alternate diaphragm for use in the sensor of FIGS. 9–11.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide an Improved Bellow-Type Pressure Sensing Apparatus.

Figure 5:
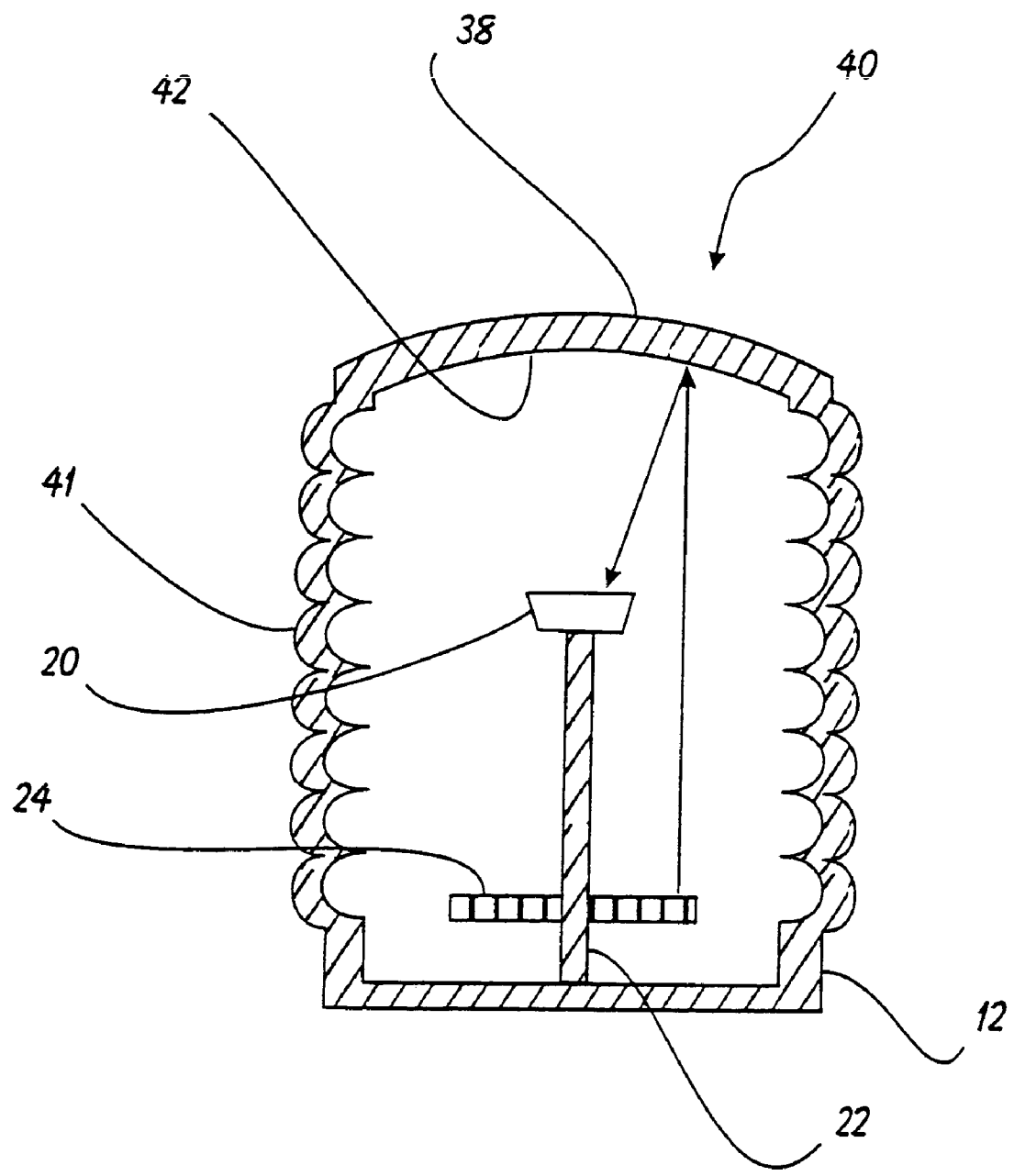
FIG. 5 is a preferred embodiment of the improved bellow type pressure sensor of the present invention.

The present invention can best be understood by initial consideration of FIG. 5. If we now turn to FIG. 5 we can examine the improved bellow-type pressure sensor 40 of the present invention.

FIG. 5 is a preferred embodiment of the improved bellow type pressure sensor 40 of the present invention. As can be seen (and just as with the prior art sensor), the sensor 40 comprises a stem 12 and a detector 20. Unlike the prior unit, however, this bellow assembly 41 comprises a curved head 38, which further forms a curved reflector 42 (known alternatively as focusing means for focusing the transmitted signals).

Figure 6A:
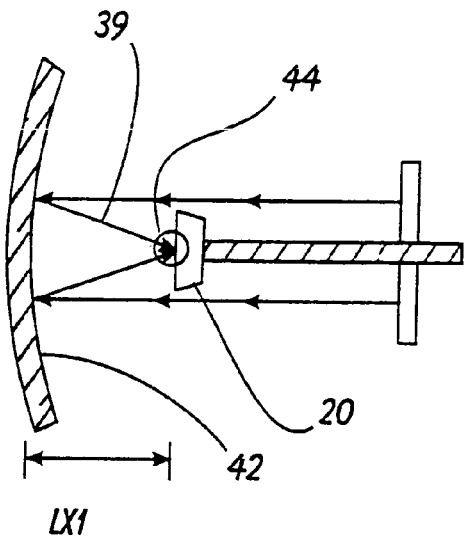
FIG. 6A is a depiction of the light path of the device of FIG. 5.

FIG. 6A is a depiction of the light path of the device of FIG. 5. As can be appreciated and as depicted by FIG. 6A, the curved reflector 42 causes transmitted light 34 to be reflected 39 into a focal point 44. If we imagine that the focal point 44 is the resting focal point (i.e. when the length of the detector 20 is $L_{X1}$) the detector 20 being located in substantially the same location as the resting focal point 44, by design.

Figure 6B:
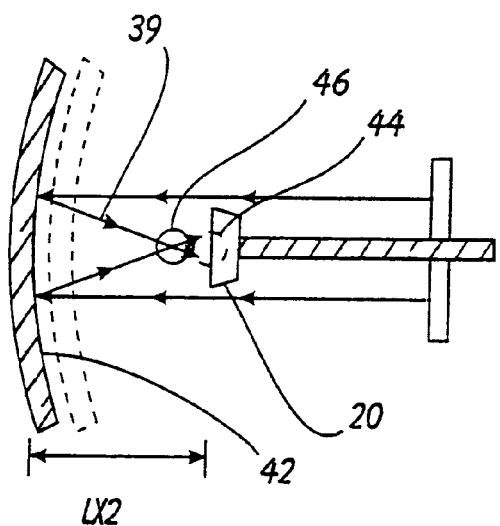
FIG. 6B depicts the light path of the device of FIG. 6A in response to a pressure change.

FIG. 6B depicts the light path of the device of FIG. 6A in response to a pressure change. If, as depicted in FIG. 6B, a pressure change causes the reflector 42 to now move to a distance $L_{X2}$ from the detector 20, it should be understood that the new focal point 46 is in a different location than the resting focal point 44. Since substantially all of the reflected light 39 is passing through the focal point 46, the detector 20 will experience a drastic change in detected light. In fact, the detected light, under certain conditions and designs, could drop to nearly zero intensity. As can be imagined, in such a design, the sensitivity of detector 20 need not be as good as with the prior designs, while still able to achieve substantial benefit in the area of dynamic range. In fact, theoretical response analysis indicates that a bellow assembly 41 having a curved reflector 42 will have many times the intensity response of the prior unit (to at least 20 dB).

Figure 1:
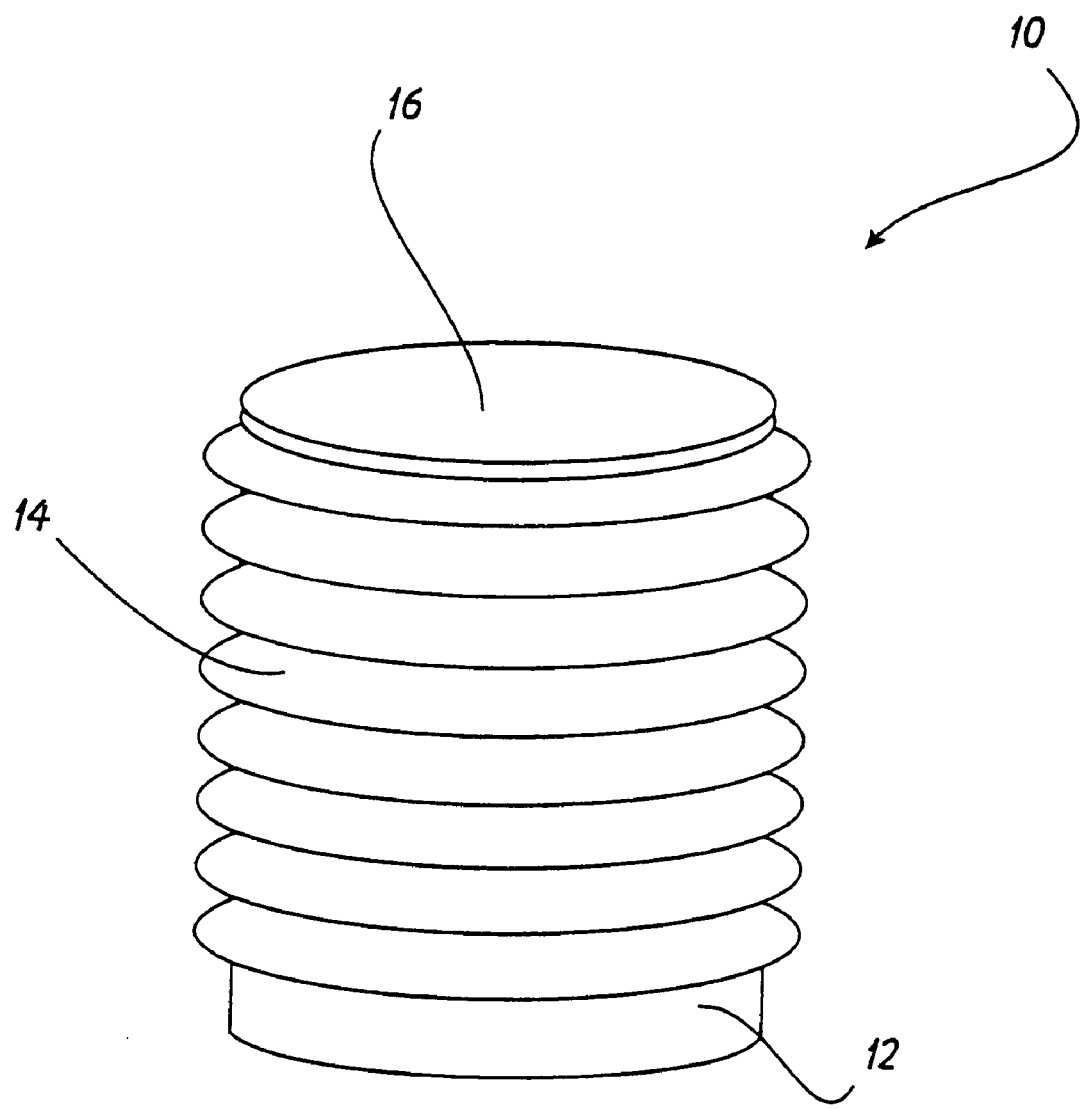
FIG. 1 is a perspective view of a prior art bellow assembly.
Figure 2:
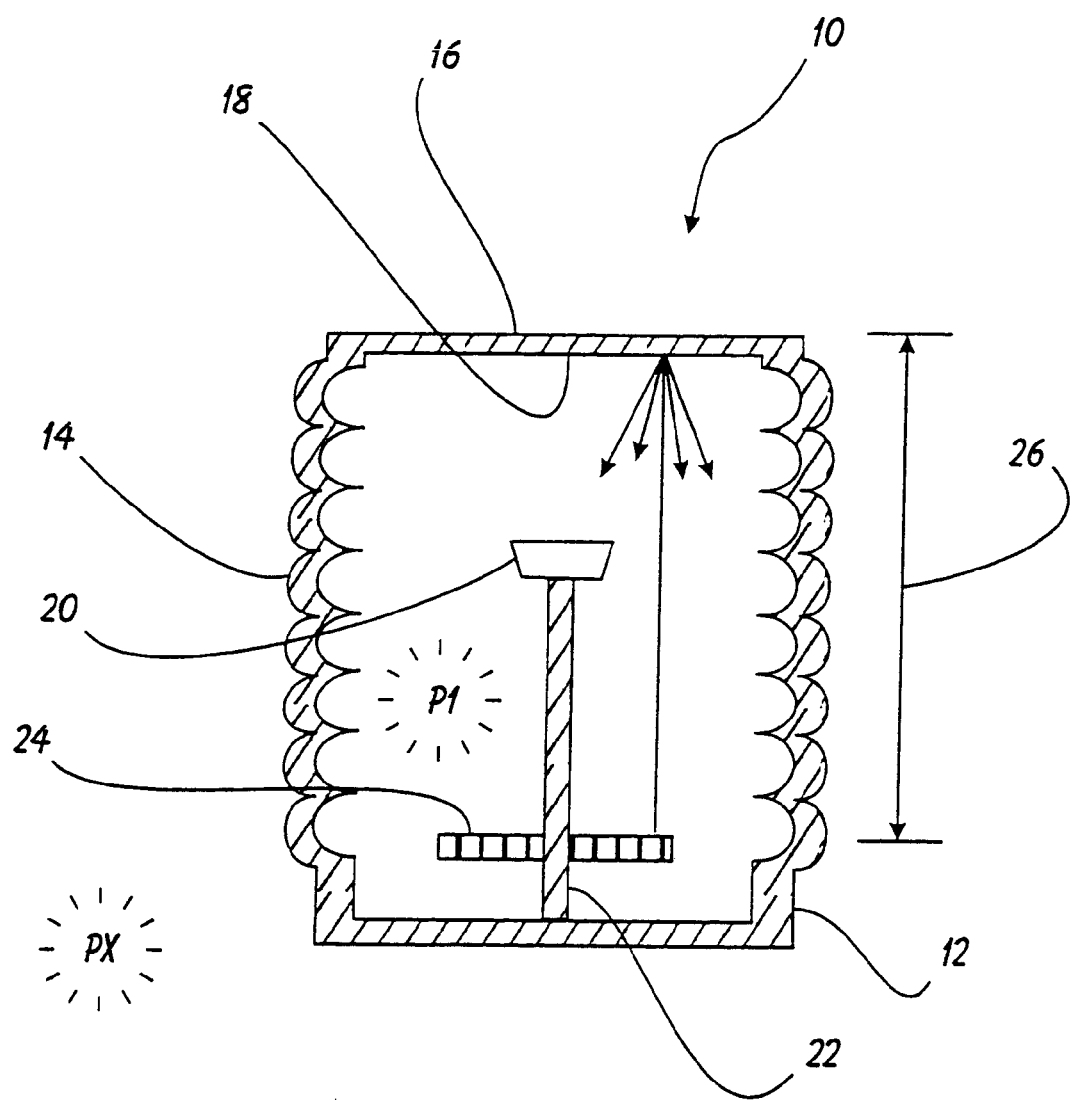
FIG. 2 is a partial cutaway side view of the bellow assembly of FIG. 1.
Figure 3:
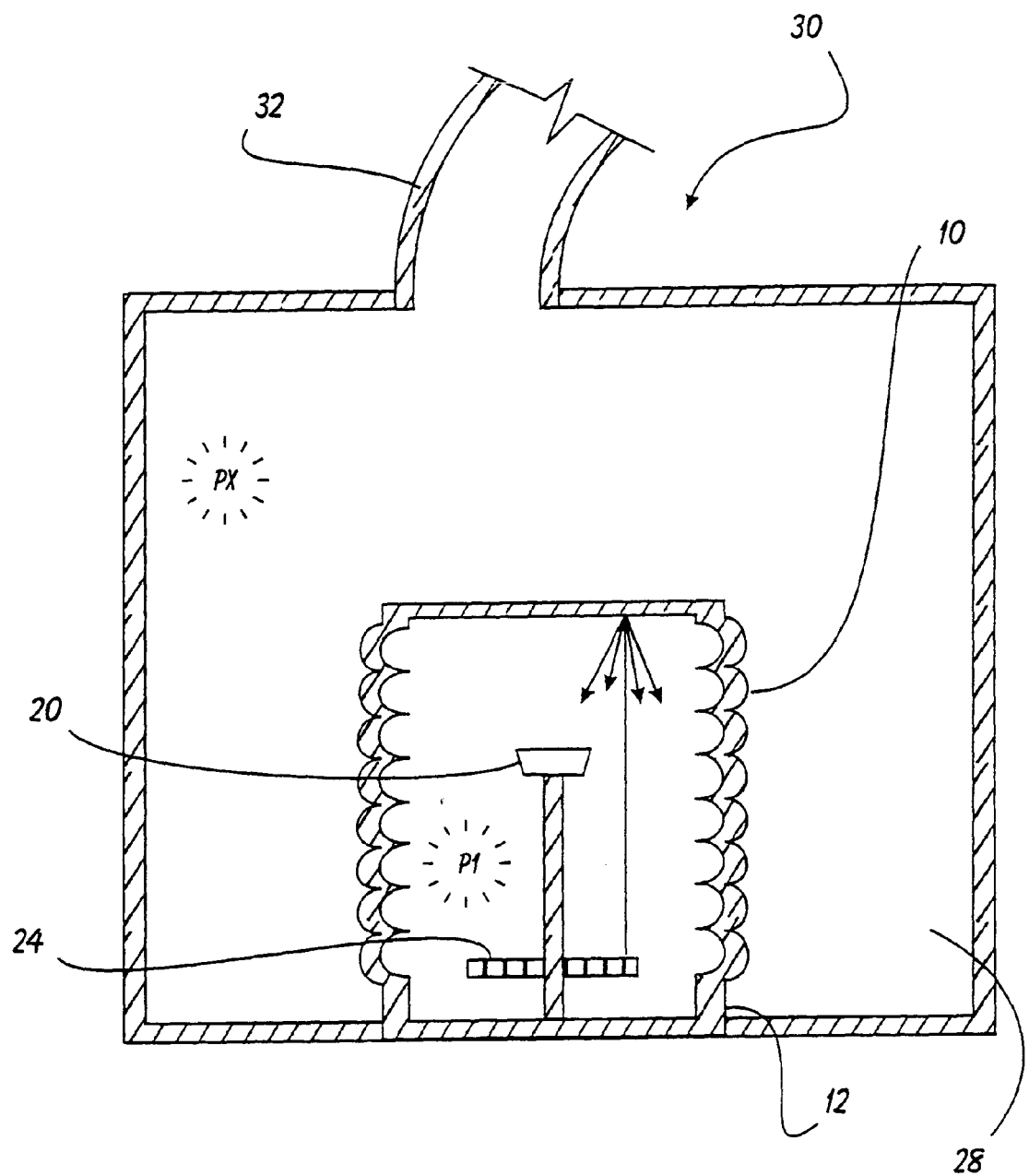
FIG. 3 is a partial cutaway side view of a conventional bellow-type pressure sensor.
Figure 4A:
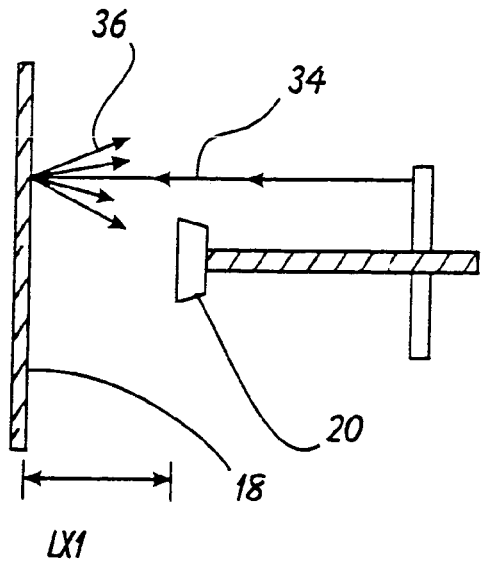
FIG. 4A is a depiction of the signal path of the bellow assembly of FIGS. 1, 2 and 3.
Figure 4B:
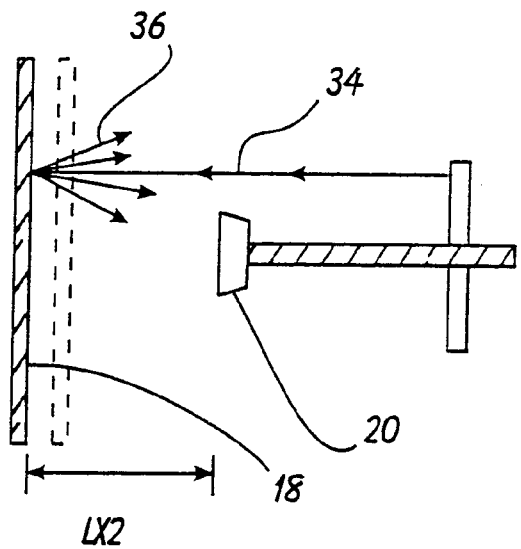
FIG. 4B is a depiction of the device of FIG. 4A after a pressure change has occurred.
Figure 4C:
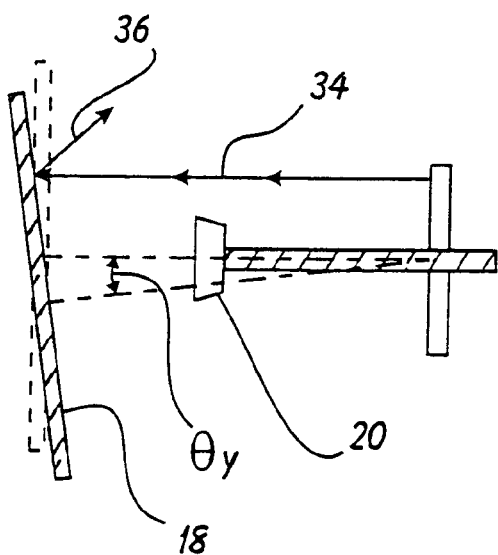
FIG. 4C is a depiction of the device of FIGS. 4A and 4B when the device is experiencing off-axis deflection.
Figure 6C:
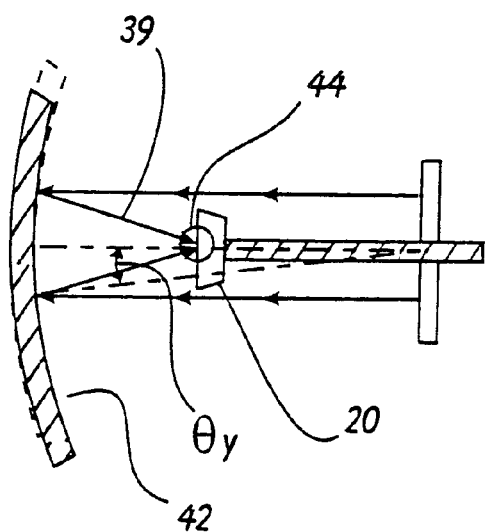
FIG. 6C is a depiction of the light path of the device of FIGS. 6A and 6B when the device is experiencing off-axis deflection.

FIG. 6C is a depiction of the light path of the device of FIGS. 6A and 6B when the device is experiencing off-axis deflection. Furthermore, and as depicted in FIG. 6C, this improved bellow assembly 41 will be much less sensitive to external acceleration and/or other forces. As can be seen, when the reflector 42 experiences off-axis deflection θy just as described above in connection with FIG. 4C, the focal point 44 will be expected to reside in substantially the identical location, so long as the center of mass is made to be close to the focal point, which is a simple design task. As such, the improved bellow-type pressure sensor 40 will be affected much less by bumping or other jarring. If we now turn to FIG. 7 we can see yet another preferred embodiment of the pressure sensor of the present invention 50.

Figure 7:
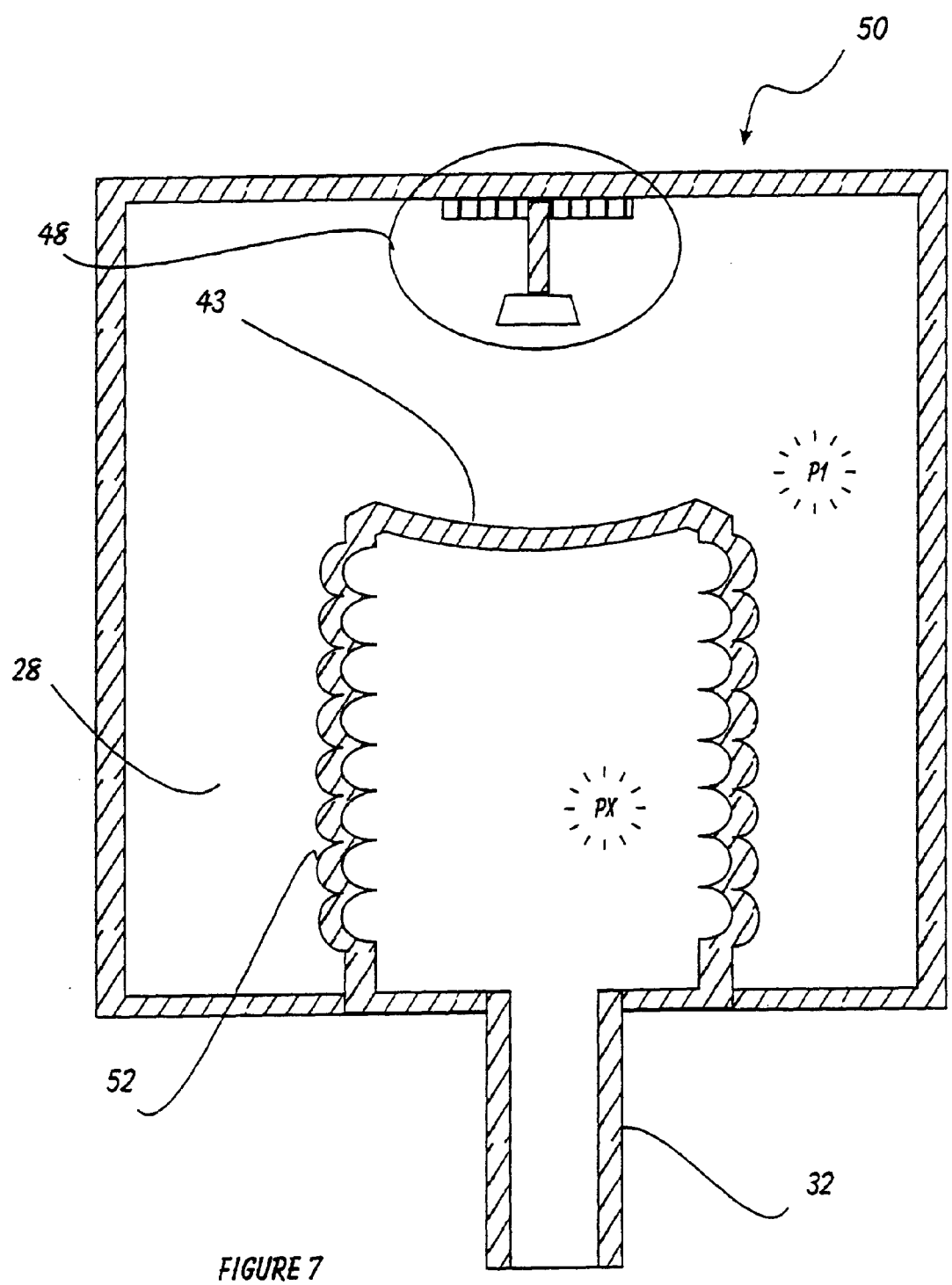
FIG. 7 is an alternate embodiment of the pressure sensor of the present invention having an alternate reflector and a unitary source/detector unit.

FIG. 7 is an alternate embodiment of the pressure sensor of the present invention 50 having an alternate reflector and a unitary source/detector unit 38. As can be seen, the alternate bellows assembly 52 of this design comprises the alternate curved reflector 43 which is, in fact, convex (on its inner surface), in this case, furthermore, the light source and light detector are located in the chamber 28 rather than within the bellow assembly 52. In fact, in this embodiment the detector and source are also found in a single unit 48 attached to the wall of the chamber 28. In this form, the sensor tube 32 is actually in fluid communication with the bellow assembly 52. This design enables the electronics to be external to the bellow, and perhaps be easier to repair. It should be understood, however, that the general operational parameters are likely to be identical to the design discussed above in connection with FIGS. 5 and 6.

Figure 8:
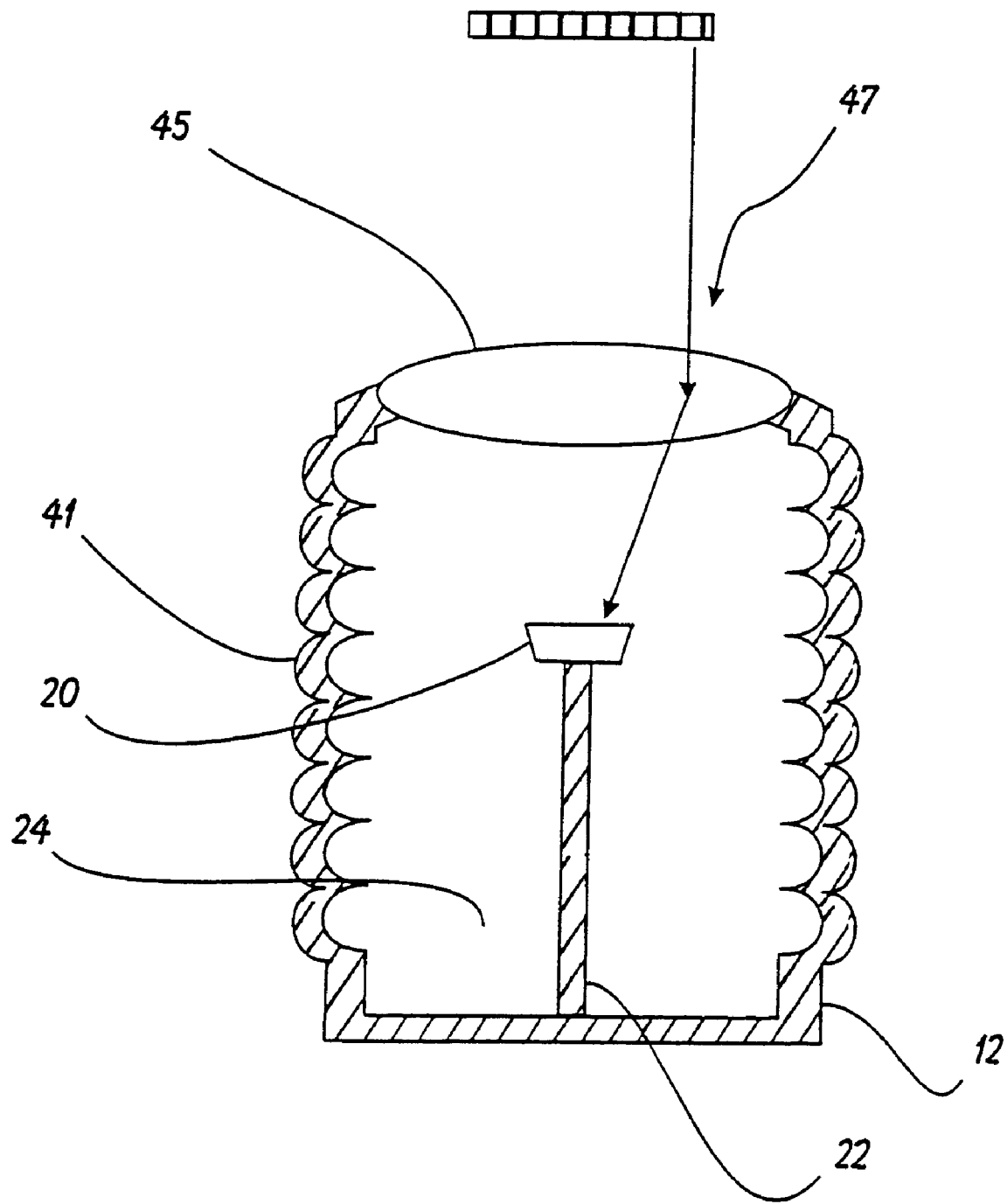
FIG. 8 is yet another alternate embodiment of the pressure sensor of the present invention having a lens unit captured within the head of the bellow assembly.

FIG. 8 is yet another alternate embodiment 47 of the pressure sensor of the present invention having a lens unit (also called a focusing means) captured within the head of the bellow assembly. In this embodiment, the curved head is replaced with a lens unit 45. While the aforementioned benefits in regard to off-axis stability are not achieved, there are substantial improvements in responsiveness over the prior devices.

Figure 9:
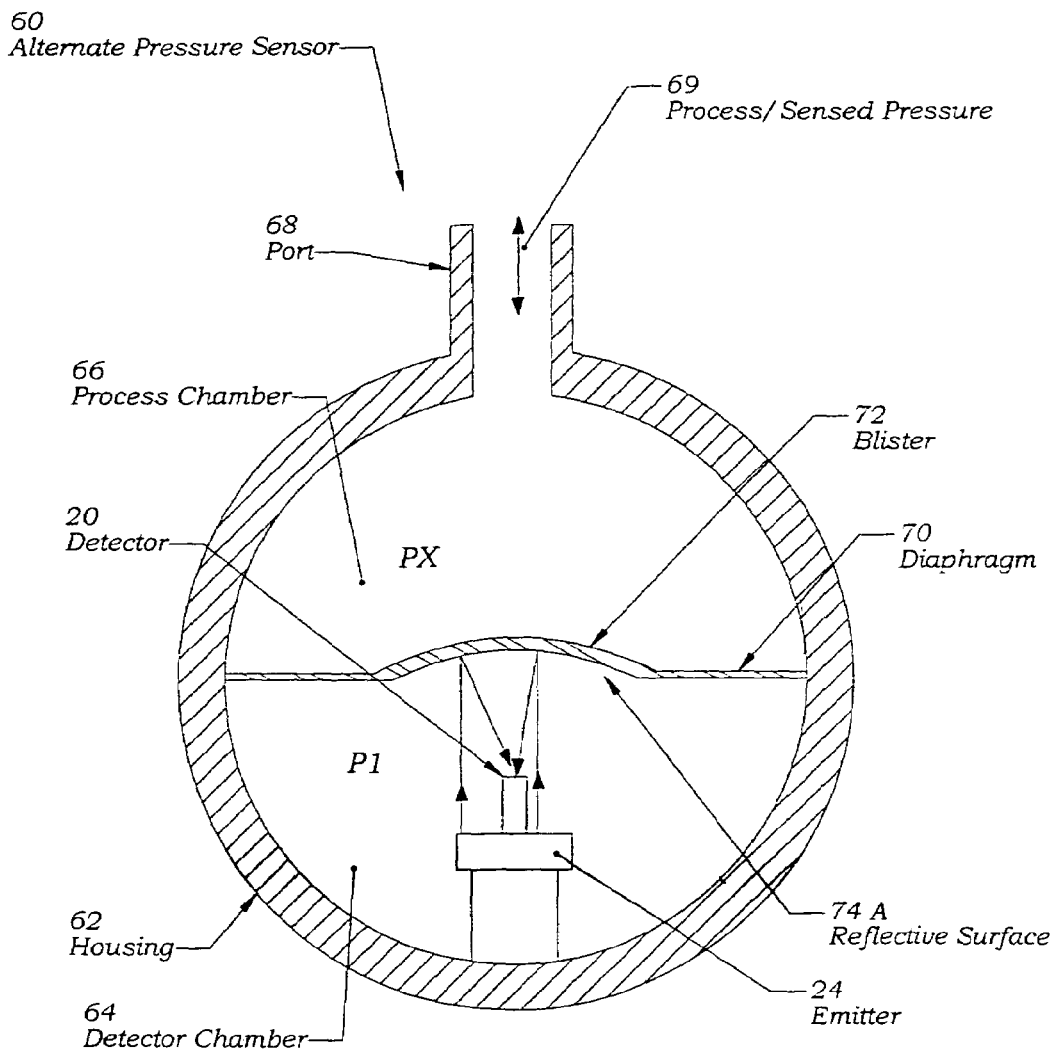
FIG. 9 is cutaway side view of an alternate pressure sensor.

FIG. 9 is cutaway side view of an alternate pressure sensor 60. This pressure sensor 60 incorporates the convenience, cost-effectiveness and durability of a diaphragm into the previously-described novel an nonobvious device. This sensor 60 comprises a housing 62 which contains a detector chamber 64 and a process chamber 66. The two chambers 64 and 66 are sealed and separated from one another by a diaphragm 70. In this version, there is a blister 72 (a raised curved portion) located in the center of the diaphragm 70. The blister 72 preferably has a polished concave reflective surface 74A that will efficiently reflect light rays transmitted by the emitter 24 such that they can then be detected by the detector 20.

It should be apparent that the pressure Px in the process chamber 66 (obtained via the port 68 leading to the process/sensed pressure area 69) will change with the pressure being sensed. In contrast, the pressure P1 in the detector chamber 64 will remain relatively constant since the detector chamber 64 is sealed, at some reference pressure, which may effectively be zero, or subject to some known reference. Now turning to FIG. 10, we can begin to discuss how this device functions.

Figure 10:
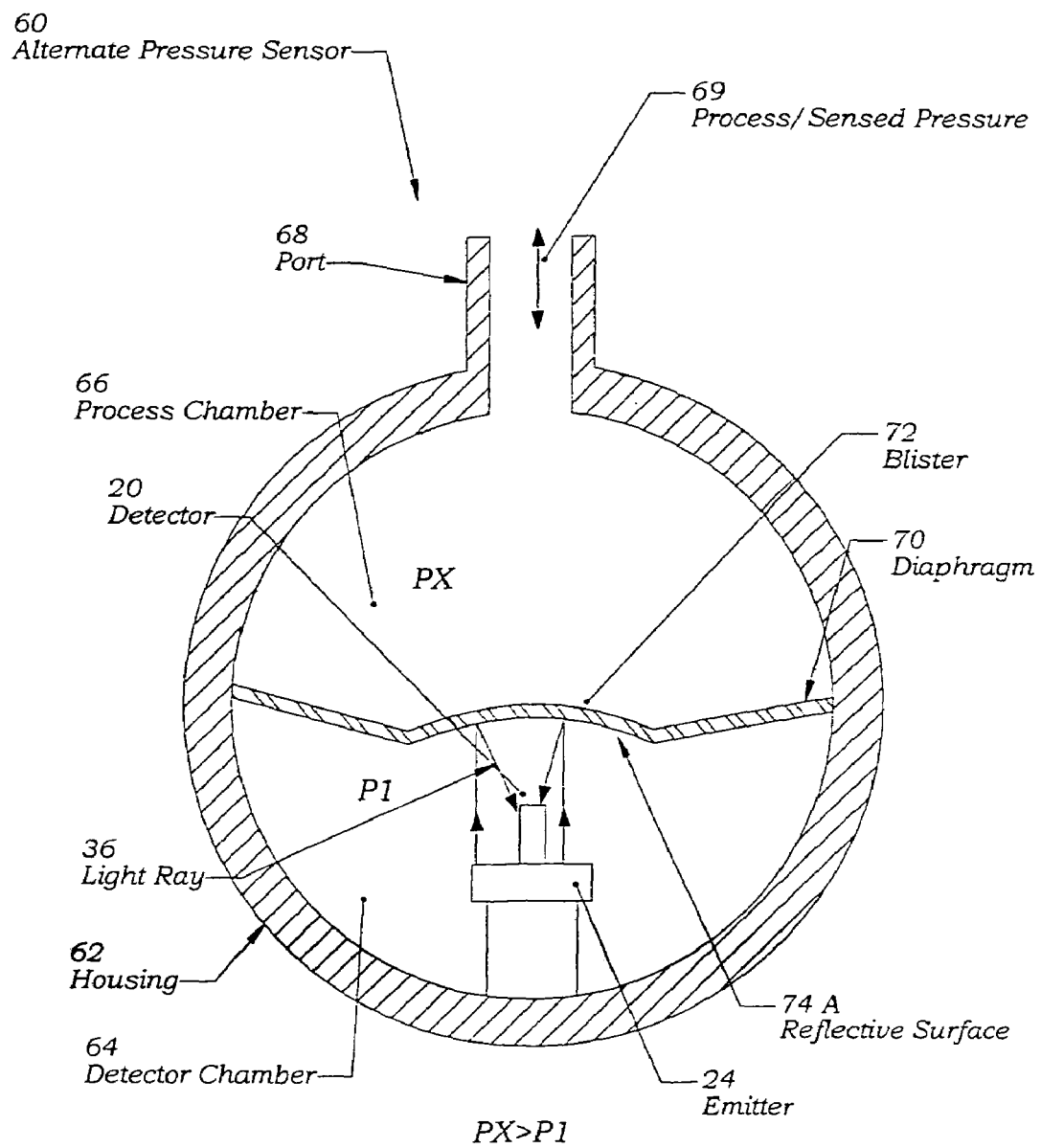
FIG. 10 is a cutaway side view of the sensor of FIG. 9 in a heightened pressure condition.

FIG. 10 is a cutaway side view of the sensor 60 of FIG. 9 in a heightened pressure condition, i.e. when pressure Px is greater than P1. Under these conditions, the resilient diaphragm 70 (and the blister 72 attached thereto) will deflect away from the process chamber 66 and towards the detector chamber 64. This depicted deflection will depend upon the difference in the pressures Px and P1, and will also cause the blister (and its reflective surface) to deflect in a stable straight line.

In this deflected state, light rays 36 being reflected off of the blister 72 will strike the detector 20 in a different location than when the diaphragm is in a non-deflected condition—in fact, the focal point (see above in previous drawing figures) will move to an imaginary point below the surface of the detector 20. Because the focal point for the reflected light rays has moved, the strength of the detected light will be reduced; this change in strength can be converted into a sensed pressure change. If we turn to FIG. 11, we can see what occurs when pressure drops.

Figure 11:
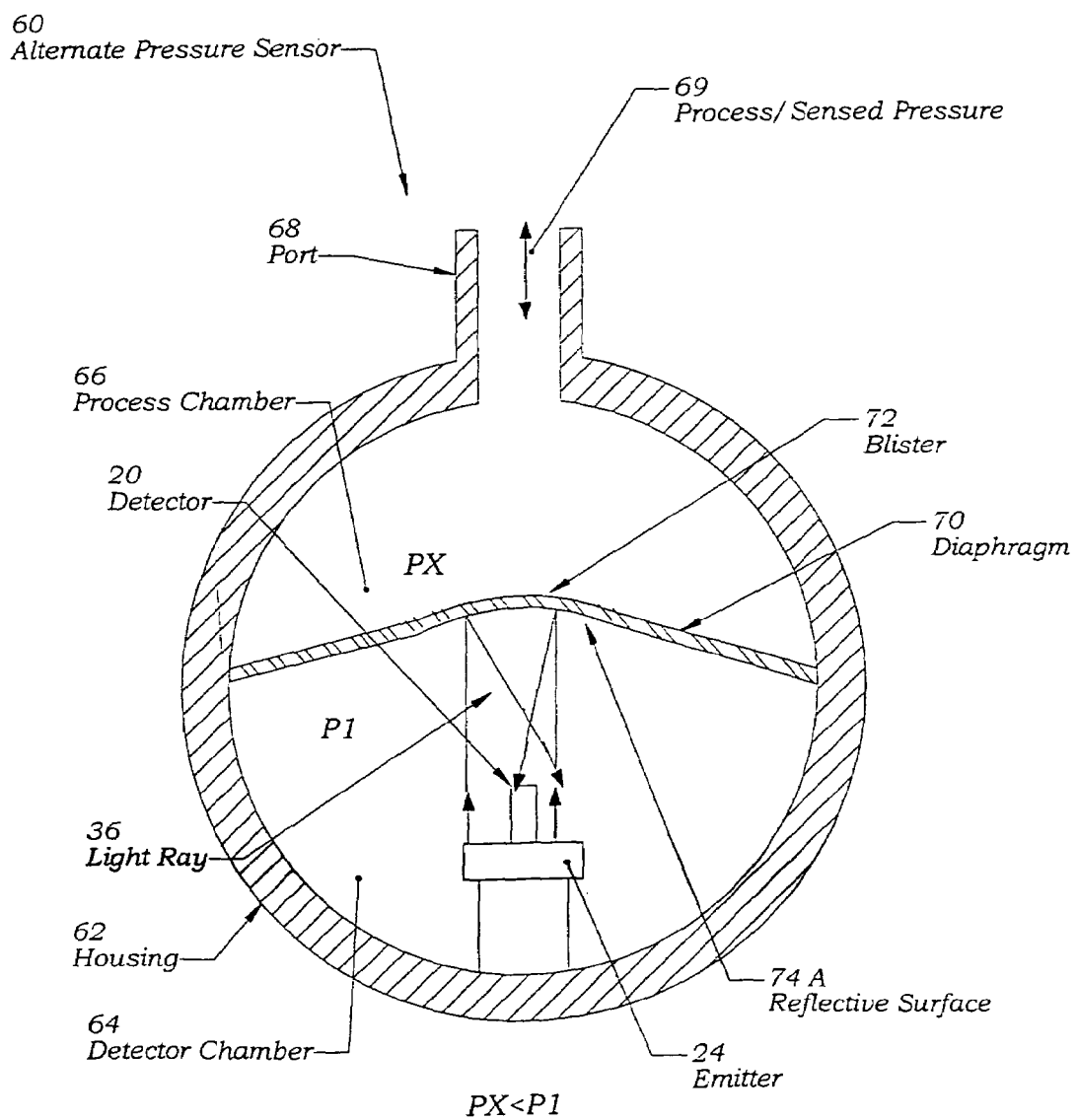
FIG. 11 is a cutaway side view of the sensor of FIGS. 9 and 10 in a reduced pressure condition.
Figure 12A:
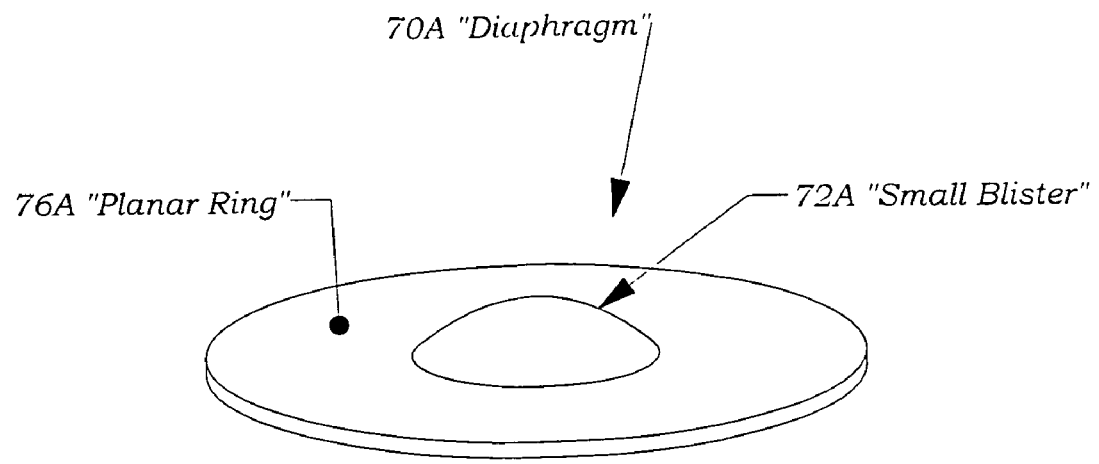
FIGS. 12A and 12B are side perspective views of a pair of alternate diaphragms for use in the sensor of FIGS. 9–11.
Figure 12B:
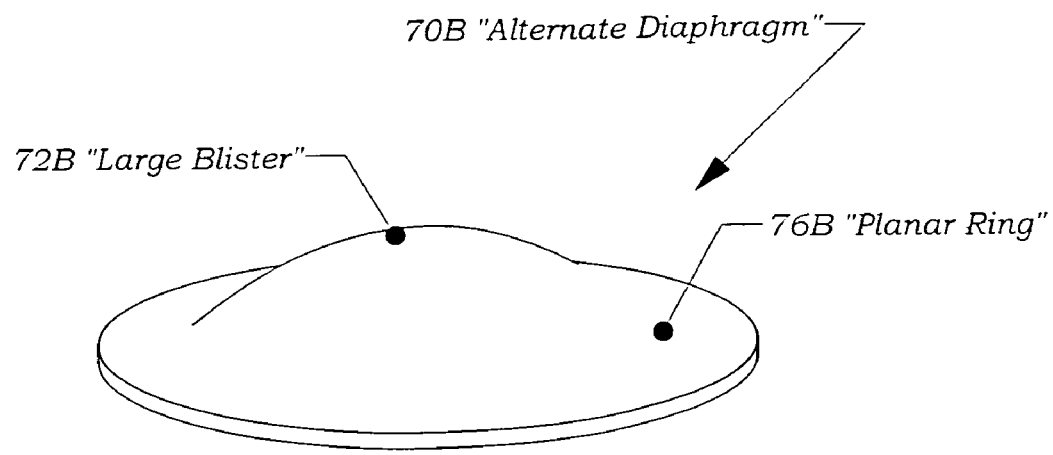

FIG. 11 is a cutaway side view of the sensor 60 of FIGS. 9 and 10 in a reduced pressure condition. Here, Px is less than P1—the result is that the diaphragm 70 deflects away from the detector chamber 64 and towards the process chamber 66. Since the blister 72 has moved away from the detector 20, the focal point of the light rays 36, has moved to a point somewhere above the surface of the detector 20. Again, the detected light strength will be reduced which can be converted into a sensed pressure. FIGS. 12A and 12B depict different versions of the diaphragm 70.

FIGS. 12A and 12B are side perspective views of a pair of alternate diaphragms 70A and 70B for use in the sensor of FIGS. 9–11. Diaphragm 70A incorporates a small blister 72A, i.e. one in which the diameter of the blister 72A is smaller than the width of the planar ring 76A. In this version, the shape of the blister 72A will remain essentially unchanged for pressure changes—the diaphragm 70A will deflect in the area of the planar ring 76A, causing the blister 72A to move closer to, or further away from the detector (see FIG. 11).

Diaphragm 70B incorporates a large blister 72B, i.e. on in which the diameter of the blister 72B is larger than the width of the planar ring 76B. In this version, the deflection of the diaphragm 70B will manifest itself in both the planar ring 76B and the blister 72B. As the planar ring 76B deflects, the blister 72B will move closer to, or further from the detector. As the blister 72B deflects, it will actually change its shape, and therefore the radius of its curvature. The changing of shape of the blister 72B actually changes the focal point of the reflected light rays—this will amplify the change in the detected light due to pressure changes. In fact, in one non-depicted embodiment, the entire diaphragm 70B acts as a large blister. This means that the planar ring 76B does not exist, and the entire diaphragm 70B can deflect to create a large blister by the curvature of the diaphragm. If we turn to FIGS. 13A and 13B, we can examine another design.

Figure 13B:
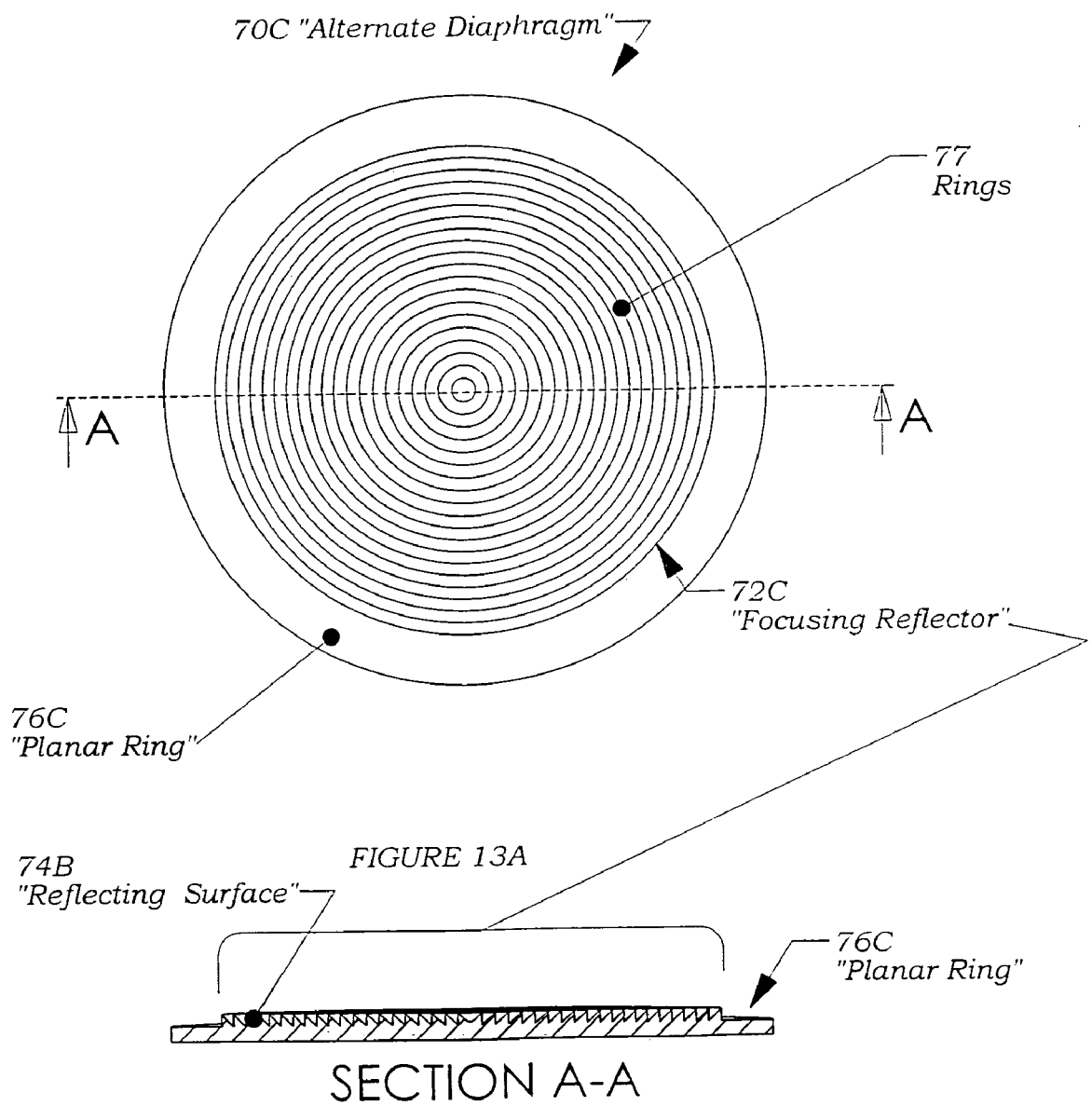

FIGS. 13A and 13B are top and cutaway side views, respectively, of another alternate diaphragm 70C for use in the sensor of FIGS. 9–11. This diaphragm 70C incorporates a substantially flat planar ring 76C with a focusing reflector 72C. The focusing reflector is a reflective device that is designed very similar to a "Fresnel" lens, however, it is opaque and reflective, rather than a translucent lens. The "fresnel" design is embodied in a plurality of concentric rings 77, with each of the rings 77 defining a reflecting surface 74B. Just as with a fresnel lens, the reflecting surfaces 74B are each at specific angles relative to one another (i.e. angles offset from perpendicular to the surface of the plane of the diaphragm) so that this substantially flat reflector will actually focus incident light to a point without the need for a concave shape. Furthermore, the fresnel-type design can be expected to allow for more predictable, stable deflection from the diaphragm in response to pressure changes, since there is no blister causing a stiffening of the diaphragm 70C. As with the large blister, the fresnel focusing reflector 72C will change its focal point as the focusing reflector is deflected (since the angles of the reflecting surfaces 74B will change as the diaphragm 70C deflects). Finally, turning to FIG. 14, we can examine yet another diaphragm 70D for use with the present invention.

Figure 14:
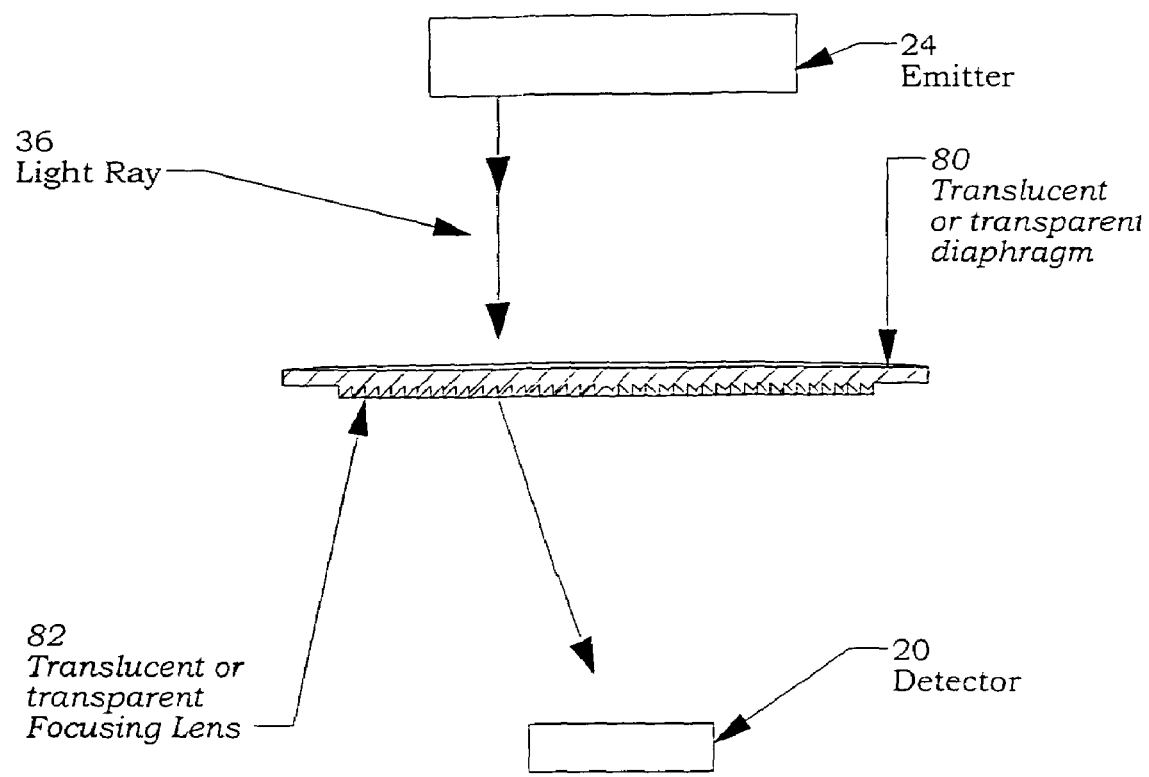
FIG. 14 is a cutaway side view of yet another alternate diaphragm for use in a sensor of the present invention.

FIG. 14 is a cutaway side view of yet another alternate diaphragm 70D for use in a sensor of the present invention. This diaphragm 70D is formed from a translucent and/or transparent base material 80, and incorporates a Fresnel lens as the focusing means 82. Here, the light rays 36 can pass through the diaphragm 70D from the emitter 24 to the detector 20. As the light passes through the substantially flat fresnel lens, the light rays will be focused to a point on the surface of the detector (when the device is at rest); when the diaphragm 70D deflects due to pressure changes, the lens 82 will change its focal properties, while at the same time the lens 82 will move either closer to, or further from the detector 20—again, this will cause a change in the detected light strength which can be converted into a sensed pressure.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An pressure sensor, comprising:
   a signal source for transmitting signals;
   a detector for detecting the strength of signals of the type transmitted by said source; and
   a sensor assembly comprising:
   a housing defining a process chamber and a detector chamber, said chambers separated by a resilient diaphragm, whereby said diaphragm flexes responsive to pressure differentials between said chambers, wherein said diaphragm further comprises focusing means formed thereon for reflecting signals transmitted by said signal source onto said detector, wherein said focusing means comprises a blister, said blister defined by an inner concave reflective surface.

2. The sensor of claim 1, wherein said diaphragm further comprises a planar ring surrounding said blister.

3. The sensor of claim 2, wherein said planar ring defines a width and said blister defines a diameter, said width being less than said diameter.

4. The sensor of claim 2, wherein said planar ring defines a width and said blister defines a diameter, said width being greater than said diameter.

* * * * *